(12) United States Patent
Cranna (10) Patent No.: US 9,731,365 B2
(45) Date of Patent: Aug. 15, 2017

(54) SAW BLADE WITH TOOTH FORM PROJECTION

(75) Inventor: Mark T. Cranna, Somers, CT (US)

(73) Assignee: IRWIN INDUSTRIAL TOOL COMPANY, Huntersville, NC (US)

( * ) Notice: Subject to any disclaimer, the term of this patent is extended or adjusted under 35 U.S.C. 154(b) by 137 days.

(21) Appl. No.: 13/313,102

(22) Filed: Dec. 7, 2011

(65) Prior Publication Data

US 2013/0149059 A1    Jun. 13, 2013

(51) Int. Cl.
*B23D 61/12*    (2006.01)

(52) U.S. Cl.
CPC .......... *B23D 61/121* (2013.01); *Y10T 83/935* (2015.04); *Y10T 83/9317* (2015.04); *Y10T 83/9319* (2015.04); *Y10T 408/895* (2015.01)

(58) Field of Classification Search
CPC .... B12D 61/02; B12D 61/023; B12D 61/025; B23D 61/12; B23D 61/14; B23D 61/021; B23D 61/123; B23D 61/02; B23D 6/04; B23D 8610/06; B23D 61/141; B23D 61/121
USPC .......... 83/835, 836, 846, 847, 849, 850, 851
See application file for complete search history.

(56) References Cited

U.S. PATENT DOCUMENTS

| 603,128 | A | 4/1898 | Clemson |
| 820,969 | A | 5/1906 | Grelck |
| 2,071,618 | A | 2/1937 | Ferrari et al. |
| 2,270,776 | A | 1/1942 | Thornton |
| 2,624,381 | A | 1/1953 | Von der Werth |
| 2,637,355 | A | 5/1953 | Chapin |
| 2,714,317 | A | 8/1955 | Drake |
| 3,866,504 | A | 2/1975 | Claesson et al. |
| 3,990,334 | A | 11/1976 | Mellgren |
| 4,031,793 | A | 6/1977 | Miaskoff |

(Continued)

FOREIGN PATENT DOCUMENTS

| DE | 100 30 168 A1 | 1/2001 |
| DE | 10253711 A1 * | 6/2004 |

(Continued)

OTHER PUBLICATIONS

"Frost Tooth Gullet Design", Armstrong Saw Engineer, Jul.-Dec. 1991, No. 139, Armstrong Manufacturing Co., Portland, Oregon.

*Primary Examiner* — Jennifer Swinney
(74) *Attorney, Agent, or Firm* — Eversheds Sutherland (US) LLP (57) ABSTRACT

A saw blade, such as a metal-cutting band saw blade, has a cutting edge including a plurality of teeth. A plurality of the teeth include a tip, a clearance surface located on one side of the tip, a rake face located on an opposite side of the tip relative to the clearance surface, a gullet, and a substantially flat, linear, or non-curvilinear projection formed between the rake face and the gullet and projecting outwardly relative to the rake face. The projection is inclined at an acute angle relative to a plane extending between the tips of consecutive unset teeth. The projection defines an inner end adjacent to the rake face and an outer end adjacent to the gullet. The inner end is located at a depth below the tip of at least about $25/1000$ inch, and the distance between the inner end and the outer end of the projection in a direction substantially parallel to the plane extending between the tips of at least two teeth is less than about $65/1000$ inch.

34 Claims, 3 Drawing Sheets

(56) References Cited

U.S. PATENT DOCUMENTS

| | | | | |
|---|---|---|---|---|
| 4,043,404 | A | 8/1977 | Sorlie et al. | |
| 4,179,967 | A * | 12/1979 | Clark | 83/846 |
| RE31,433 | E | 11/1983 | Clark | |
| 4,557,172 | A * | 12/1985 | Yoneda | 83/848 |
| 4,603,613 | A | 8/1986 | Wilson | |
| 4,867,026 | A | 9/1989 | Henning et al. | |
| 4,958,546 | A | 9/1990 | Yoshida et al. | |
| 5,016,356 | A | 5/1991 | Trench | |
| 5,331,876 | A | 7/1994 | Hayden, Sr. | |
| 5,410,935 | A | 5/1995 | Holston et al. | |
| 5,425,296 | A | 6/1995 | Kullmann et al. | |
| 5,440,960 | A | 8/1995 | Sadahiro | |
| 5,603,252 | A | 2/1997 | Hayden, Sr. | |
| 5,606,900 | A | 3/1997 | Stoddard | |
| 5,642,766 | A | 7/1997 | MacCauley, III | |
| 5,826,477 | A | 10/1998 | Brewer, Sr. | |
| 5,832,803 | A | 11/1998 | Hayden, Sr. | |
| 5,868,058 | A | 2/1999 | Senegas | |
| 6,003,422 | A | 12/1999 | Holston | |
| D427,865 | S | 7/2000 | Mills, Jr. | |
| 6,152,815 | A | 11/2000 | Meerdink et al. | |
| 6,158,324 | A * | 12/2000 | Kullmann et al. | 83/848 |
| 6,167,792 | B1 * | 1/2001 | Korb et al. | 83/835 |
| D439,666 | S | 3/2001 | Ventura | |
| 6,220,139 | B1 | 4/2001 | Kobayashi et al. | |
| 6,220,140 | B1 | 4/2001 | Hellebergh | |
| 6,244,152 | B1 | 6/2001 | Di Nicolantonio | |
| 6,314,854 | B1 | 11/2001 | Fritz et al. | |
| 6,439,094 | B1 | 8/2002 | Yoneda et al. | |
| 6,505,537 | B1 | 1/2003 | Vöge | |
| 6,520,722 | B2 | 2/2003 | Hopper et al. | |
| 6,532,852 | B1 | 3/2003 | Tsujimoto et al. | |
| 6,588,992 | B2 | 7/2003 | Rudolph | |
| 6,598,509 | B2 | 7/2003 | Cook et al. | |
| 6,601,495 | B2 | 8/2003 | Cranna | |
| 6,834,573 | B1 * | 12/2004 | Nakahara | B23D 61/121 83/835 |
| 7,017,465 | B2 | 3/2006 | Dion et al. | |
| 7,036,415 | B2 | 5/2006 | Tsujimoto | |
| 7,036,417 | B2 | 5/2006 | Alton | |
| 7,077,041 | B2 | 7/2006 | Kunkel et al. | |
| 7,121,180 | B2 | 10/2006 | Shimofurutani | |
| 7,127,979 | B2 | 10/2006 | Kocher et al. | |
| 7,150,215 | B2 | 12/2006 | Krehel | |
| 7,163,366 | B2 | 1/2007 | Chen | |
| 7,178,441 | B2 | 2/2007 | Hellbergh | |
| 7,216,942 | B2 | 5/2007 | Yasutake et al. | |
| 7,225,714 | B2 | 6/2007 | Rompel et al. | |
| D555,444 | S | 11/2007 | Ammann | |
| 7,334,511 | B2 | 2/2008 | Hesselberg et al. | |
| D575,808 | S | 8/2008 | Zeiler et al. | |
| 7,451,678 | B2 | 11/2008 | Dion et al. | |
| 7,488,146 | B2 | 2/2009 | Brunson | |
| 7,517,179 | B2 | 4/2009 | Miller et al. | |
| 7,559,726 | B1 | 7/2009 | Beach | |
| 7,568,416 | B2 * | 8/2009 | Tsujimoto | 83/846 |
| 7,578,672 | B2 | 8/2009 | Sheikh et al. | |
| D605,672 | S | 12/2009 | Allen et al. | |
| 7,625,160 | B2 | 12/2009 | Zeiler et al. | |
| 7,661,347 | B2 | 2/2010 | Nagano et al. | |
| 7,832,320 | B2 | 11/2010 | Earle et al. | |
| 7,913,601 | B2 * | 3/2011 | Petts et al. | 83/846 |
| 8,210,081 | B2 * | 7/2012 | Elliston et al. | 83/835 |
| 8,621,972 | B2 * | 1/2014 | Nagano | 83/846 |
| 8,695,470 | B2 | 4/2014 | Kullmann et al. | |
| 2002/0124707 | A1 | 9/2002 | Izard | |
| 2004/0035282 | A1 * | 2/2004 | Tsujimoto | B23D 61/021 83/849 |
| 2004/0255740 | A1 * | 12/2004 | Troyer | B23D 61/121 83/13 |
| 2006/0065098 | A1 * | 3/2006 | Cranna | B23D 61/121 83/661 |
| 2009/0274923 | A1 | 11/2009 | Hall et al. | |
| 2011/0265627 | A1 * | 11/2011 | Kwanka | 83/661 |

FOREIGN PATENT DOCUMENTS

| | | |
|---|---|---|
| DE | 10 2006 015 278 A1 | 10/2007 |
| EP | 1 586 401 A1 | 10/2005 |
| ES | 2352223 | 10/2007 |
| GB | 2 354 480 A | 3/2001 |
| JP | 52026679 A * | 2/1977 |
| JP | 63-256309 A | 10/1988 |
| JP | H01-011708 | 1/1989 |
| JP | S6411708 A | 1/1989 |
| JP | 6000-716 A | 1/1994 |
| JP | 6000-717 A | 1/1994 |
| JP | 2000-343325 A | 12/2000 |
| JP | 2001-9634 A | 1/2001 |
| JP | 2001-62629 A | 3/2001 |
| JP | 2004-504170 A | 2/2004 |
| WO | WO 99/32251 | 7/1999 |
| WO | WO0206020 A1 | 1/2002 |
| WO | WO 2006/042929 A1 | 4/2006 |
| WO | WO 2007/098276 A2 | 8/2007 |
| WO | WO 2008/092239 A1 | 8/2008 |
| WO | WO 2009/073030 A1 | 6/2009 |
| WO | WO 2010/148471 A1 | 12/2010 |
| WO | WO 2011/002411 A1 | 1/2011 |

* cited by examiner

FIG. 1

| GUL. # | PITCH | CA2 | R1 | 38 | R2 | D1 |
|---|---|---|---|---|---|---|
| 1 | .526 | 38 | .200 | .109 | .075 | .042 |
| 2 | .479 | 38 | .170 | .084 | .070 | .042 |
| 3 | .413 | 42 | .155 | .083 | .051 | .047 |
| 4 | .360 | 44 | .126 | .083 | .040 | .047 |
| 5 | .426 | 38 | .158 | .083 | .055 | .042 |

| GUL. # | PITCH | RA | CA | CA2 | R1 | 38 | R2 |
|---|---|---|---|---|---|---|---|
| 1 | .526 | 16 | 24 | 38 | .200 | .109 | .075 |
| 2 | .479 | 16 | 24 | 38 | .170 | .086 | .068 |
| 3 | .413 | 10 | 24 | 40 | .119 | .086 | .055 |
| 4 | .360 | 10 | 29 | 40 | .088 | .086 | .050 |
| 5 | .426 | 16 | 28 | 40 | .160 | .095 | .060 |

FIG. 4

FIG. 5

SAW BLADE WITH TOOTH FORM PROJECTION

FIELD OF THE INVENTION

The present invention relates to saw blades, and more particularly, relates to metal-cutting saw blades, such as band saw blades or hole cutters, for cutting difficult-to-cut materials.

BACKGROUND

One of the drawbacks of prior art band saw blades, particularly band saw blades that are used to cut difficult-to-cut materials, such as tool steels, stainless steels, nickel-based alloys, or other hardened or work hardened materials and/or materials that exhibit relatively high shear stress, is that the blade life is not as long as desired and/or the blades do not cut the materials as straight as desired. Current band saw blade designs attempt to overcome these drawbacks by using two distinct methodologies. One approach has been to apply extreme rake angles to traditional tooth/set geometries, without differentiating between "kerf-generating" and "non-kerf-generating" tooth features. Another approach has been to incorporate a "radius" feature on the rake face to capture the chips. Although these methodologies can be moderately effective when the blades are new, and therefore relatively sharp, they have significant drawbacks. The first methodology leads to rapid tool wear due to the use of relatively aggressive, "self-feeding" geometries on the rake faces of kerf-generating teeth. This approach tends to fracture or "chip-out" these teeth in an uncontrolled, unpredictable manner. With the second methodology, on the other hand, the full-contact radius feature allows for an extended tool-chip interface region that leads to increased cutting forces and higher heat generation back into the tool which, in turn, leads to more rapid wear than desired.

It is an object of the present invention to overcome one or more of the above-described drawbacks and/or disadvantages of the prior art.

SUMMARY OF THE INVENTION

The present invention is directed to a saw blade, such as a metal-cutting band saw blade or hole saw or hole cutter. The saw blade comprises a cutting edge including a plurality of teeth thereon. A plurality of the teeth include a tip, a clearance surface located on one side of the tip, a rake face located on an opposite side of the tip relative to the clearance surface, a gullet, and a substantially flat, linear, or non-curvilinear projection formed between the rake face and the gullet and projecting outwardly relative to the rake face. The projection is inclined at an acute angle relative to a plane extending between the tips of at least two teeth. The projection defines an inner end adjacent to the rake face and an outer end adjacent to the gullet. The inner end is located at a depth below the tip of at least about $25/1000$ inch, and the distance between the inner end and the outer end of the projection in a direction substantially parallel to the plane extending between the tips of at least two teeth is less than about $65/1000$ inch.

In some embodiments of the present invention, the projection is inclined at an acute angle relative to the plane extending between the tips of at least two teeth within the range of about 64° to about 79°, and preferably within the range of about 66° to about 70°.

In some embodiments of the present invention, the inner end of the projection is located at a depth below the tip within the range of about $25/1000$ inch to about $65/1000$ inch, and preferably within the range of about $30/1000$ inch to about $55/1000$ inch.

In some embodiments of the present invention, the rake face defines a positive rake angle. A rake face defines a positive rake angle when the rake face is inclined inwardly at an angle of greater than 90° relative to a plane extending between the tips of teeth. A rake face defines a "zero degree" rake angle, on the other hand, when the rake face is oriented at 90° relative to a plane extending between the tips of teeth. A positive rake angle is determined based on the extent to which the rake face is inclined inwardly relative to the plane extending between the tips of teeth beyond 90°, e.g., 91° is equal to a 1° positive rake angle, 92° is equal to a 2° positive rake angle, and so on. In the currently preferred embodiments of the present invention, the positive rake angle is preferably within the range of about 10° to about 17°, and more preferably is within the range of about 12° to about 16°.

In some embodiments of the present invention, the distance between the inner end and the outer end of the projection in a direction substantially parallel to the plane extending between the tips of at least two teeth is at least about $5/1000$ inch, is preferably at least about $10/1000$ inch, is more preferably at least about $15/1000$ inch, and is even more preferably at least about $20/1000$ inch. In other embodiments of the present invention, the distance between the inner end and the outer end of the projection in a direction substantially parallel to the plane extending between the tips of at least two teeth is within the range of about $5/1000$ inch to about $25/1000$ inch, and is more preferably, within the range of about $8/1000$ inch to about $20/1000$ inch.

In some embodiments of the present invention, the plurality of teeth define a repeating set pattern including an unset leading tooth, at least one relatively light-set tooth trailing the unset leading tooth and defining a relatively light set magnitude, and at least one relatively heavy set tooth trailing the unset leading tooth and defining a relatively heavy set magnitude in comparison to the set magnitude of the relatively light set tooth. The relatively heavy set tooth defines a rake angle that is less than the rake angle of at least one of the unset leading tooth and the relatively light set tooth. In some such embodiments, the relatively heavy set tooth defines a rake angle that is less than the rake angle of the unset leading tooth and the relatively light set trailing tooth. In some such embodiments, the relatively heavy set tooth defines a rake angle that is at least about 60% less than each of the rake angle of the unset leading tooth and the rake angle of the relatively light set trailing tooth. In some such embodiments, the relatively heavy set tooth defines a rake angle that is within the range of about 60% to about 80% less than each of the rake angle of the unset leading tooth and the rake angle of the relatively light set trailing tooth (i.e., about 60% to about 80% of about 10° to about 17°, and more preferably, of about 12° to about 16°).

In some embodiments of the present invention, the repeating set pattern includes an unset leading tooth, a relatively light right set trailing tooth, a relatively heavy left set trailing tooth, a relatively heavy right set trailing tooth, and a relatively light left set trailing tooth. In some such embodiments, the unset leading tooth is followed by the light right set trailing tooth, which is followed by the relatively heavy left set trailing tooth, which is followed by the relatively heavy right set trailing tooth, which is followed by the relatively light left set trailing tooth.

In some embodiments of the present invention, the plurality of teeth define a repeating set pattern including an unset leading tooth, at least one relatively light set tooth trailing the unset leading tooth and defining a relatively light set magnitude, and at least one relatively heavy set tooth trailing the unset leading tooth and defining a relatively heavy set magnitude in comparison to the set magnitude of the relatively light set tooth. The relatively heavy set tooth defines a primary clearance angle that is less than the primary clearance angle of the unset leading tooth and the primary clearance angle of the relatively light set trailing tooth. In some such embodiments, the primary clearance angle of the relatively heavy set tooth is within the range of about 0° to about 8°. In some embodiments, the primary clearance surface of the relatively heavy set tooth is shorter than the primary clearance surface of the unset leading tooth and the primary clearance surface of the relatively light set tooth. In some such embodiments, the primary clearance surface of the relatively heavy set tooth defines a length within the range of about $2/1000$ inch to about $6/1000$ inch.

In accordance with another aspect, the present invention is directed to a metal-cutting saw blade, such as a band saw blade or hole cutter blade, comprising a cutting edge including a plurality of teeth thereon. A plurality of the teeth include a tip, a clearance surface located on one side of the tip, a rake face located on an opposite side of the tip relative to the clearance surface, a gullet, and means projecting outwardly from the rake face between the rake face and the gullet for tangentially contacting and creating curled metal chips and moving them away from the rake face toward the opposite side of the gullet relative to the rake face.

In some embodiments of the present invention, the means for contacting and creating curled metal chips and moving them (i) is inclined at an acute angle relative to a plane extending between the tips of at least two teeth, (ii) defines an inner end adjacent to the rake face and an outer end adjacent to the gullet, (iii) the inner end is located at a depth below the tip of at least about $25/1000$ inch, and (iv) the distance between the inner end and the outer end in a direction substantially parallel to the plane extending between the tips of at least two teeth is less than about $65/1000$ inch. In some embodiments of the present invention, the means for contacting and creating curled metal chips and moving them is a substantially flat, linear, or non-curvilinear projection.

One advantage of the present invention is that the substantially flat, linear, or non-curvilinear projection or like means allows for the creation of relatively tightly curled metal chips that are projected or moved away from the front edge or rake face of the tooth toward the far or opposite side of the gullet. This redirecting of the forming chip results in an efficient use of available tooth gullet capacity and a reduction in the heat generated at the rake face surface due to the minimized tool/chip contact zone in comparison to prior art metal cutting saw blades. Yet another advantage of the currently preferred embodiments of the present invention is that the depth of the projection, and the length and inclined angle of the projection, are within a geometry window that facilitates formation of relatively tightly curled metal chips without the adverse effects of increased cutting forces at the tooth tip as encountered in prior art saw blades. More specifically, because the substantially flat, linear, or non-curvilinear projection is located at a depth below the tooth tip within the range of about $25/1000$ inch to about $65/1000$ inch, and preferably within the range of about $30/1000$ inch to about $55/1000$ inch, and because the distance between the inner end and the outer end of the projection in a direction substantially parallel to the plane extending between the tips of at least two teeth is within the range of about $5/1000$ inch to about $25/1000$ inch, and more preferably within the range of about $8/1000$ inch to about $20/1000$ inch, the projection is allowed to form relatively tightly curled metal chips substantially without the adverse effects of increased cutting forces at the tooth tip. Yet another advantage is that the substantially flat, linear, or non-curvilinear projection tangentially contacts the chips to minimize the surface area of the projection in contact with the chips and the resulting cutting forces imparted on the tooth, while nevertheless forming relatively tightly curled chips and projecting or moving them toward the opposite side of the gullet.

Yet another advantage of some currently preferred embodiments of the present invention is that they incorporate multi-level set geometries for both increasing blade life and providing straighter cuts in comparison to prior art saw blades. It has been discovered that a primary driver for overall cutting forces is the relative cutting efficiency of the unset and relatively light set teeth. Accordingly, in the currently preferred embodiments of the present invention, these teeth define relatively aggressive rake angles along with the chip-controlling projection described above to penetrate the sawn material with a relatively low resistance. It also has been discovered that a key to relatively long blade life with relatively straight cuts resides in the relatively heavy set teeth. In some embodiments of the present invention, the relatively heavy set teeth define less aggressive rake angles, preferably within the range of about 60% to about 80% of the rake angles of the unset and relatively light set teeth. The relatively less aggressive rake angles allow the heavy set teeth to maintain substantially straight cuts due to the relatively slow or controlled wear of such teeth, while nevertheless maintaining relatively low cutting forces and tightly controlled chips due to the geometries of the unset and light set teeth, as described above.

Yet another advantage of some embodiments of the present invention is that the heavy set teeth define relatively shallow primary clearance angles in comparison to the unset and relatively light set teeth, such as clearance angles within the range of about 0° to about 8°, and define primary clearance surface lengths within the range of about $2/1000$ inch to about $6/1000$ inch, to thereby impart a relatively stable, "pre-worn" tooth geometry to the relatively heavy set teeth. As a result, the relatively heavy set teeth wear in a relatively even or consistent manner by avoiding the relatively chaotic tooth wear that can be inherent in saw teeth with sharper tips (e.g., with more aggressive primary clearance angles and/or longer primary clearance surfaces), while nevertheless maintaining relatively low cutting forces and tightly controlled chips due to the geometries of the unset and light set teeth, as described above.

Accordingly, the saw blades of the present invention, such as metal-cutting band saw blades, provide significant user benefits when cutting difficult-to-cut materials, such as tool steels, stainless steels, nickel-based alloys, or other hardened or work hardened materials and/or materials that exhibit relatively high shear stress. Yet another advantage of the saw blades of the present invention is that they allow such materials to be cut with increased blade life and straighter cuts in comparison to prior art saw blades.

Other objects and advantages of the present invention, and/or of the currently preferred embodiments thereof, will become more readily apparent in view of the following detailed description of the currently preferred embodiments and accompanying drawings.

DETAILED DESCRIPTION OF CURRENTLY PREFERRED EMBODIMENTS

Figure 1:
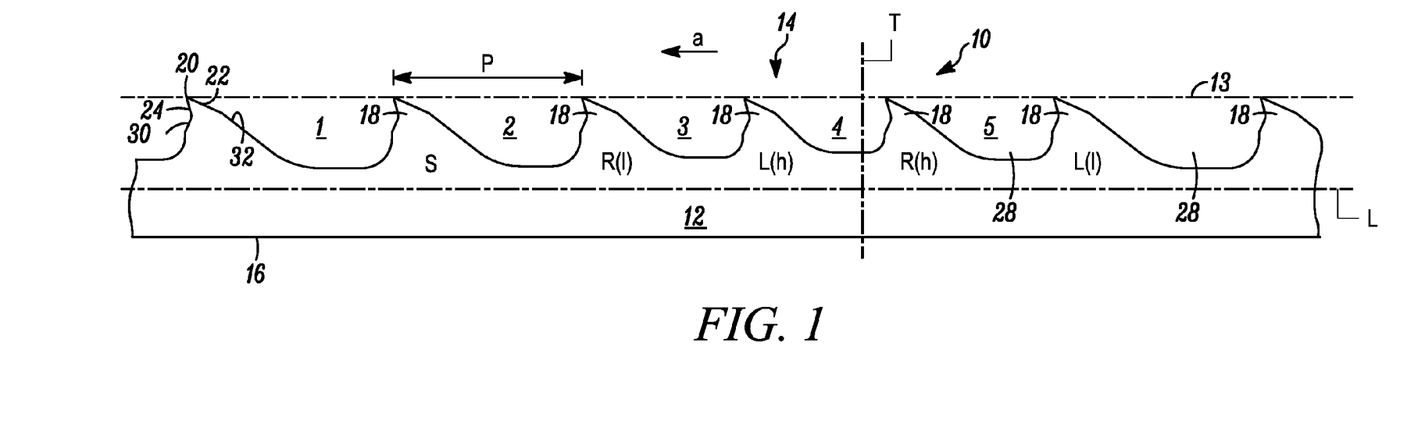
FIG. 1 is a partial, side elevational view of a band saw blade embodying the present invention.

In FIG. 1, a saw blade for cutting difficult-to-cut materials in accordance with an embodiment of the present invention is indicated generally by the reference numeral 10. In FIG. 1, the saw blade 10 is a band saw blade comprising a band 12 having a cutting edge 14 and a back edge 16, and defining a longitudinal axis "L" and a transverse axis "T". The direction of cutting (the forward direction) is indicated by the arrow "a". The cutting edge 14 of the band saw blade 10 includes a plurality of teeth 18, 18 thereon. The spacing measured between the tips of adjacent teeth, as illustrated in FIG. 1, is the pitch "P". However, as may be recognized by those of ordinary skill in the pertinent art based on the teachings herein, the pitch may be measured between any of numerous other corresponding points between adjacent teeth.

Figure 3:
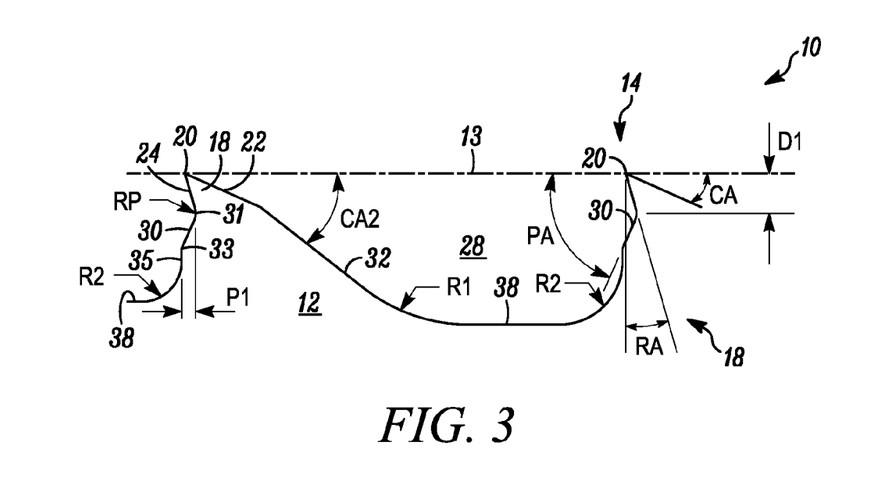
FIG. 3 is an enlarged partial, side elevational view of two exemplary successive teeth of the band saw blade of FIG. 1.

Referring to FIG. 3, each tooth 18 includes a tip 20, a primary clearance surface 22 located on one side of the tip, a rake face 24 located on an opposite side of the tip relative to the primary clearance surface, a gullet 28, a secondary clearance surface 32 formed between the primary clearance surface and the gullet, and a substantially flat, linear, or non-curvilinear projection 30 formed between the rake face and the gullet. Each primary clearance surface 22 defines a first acute clearance angle CA with respect to a plane 13 extending between the tips of consecutive unset teeth or the longitudinal axis L of the blade, and each secondary clearance surface 32 defines a secondary acute clearance angle CA2 with respect to the plane 13. In the illustrated embodiments, each primary clearance angle is less than the respective secondary clearance angle, the primary clearance angles are within the range of about 22° to about 32°, and the secondary clearance angles are within the range of about 34° to about 44°. Each gullet 28 is defined by a first gullet radius "R1" extending between the secondary clearance surface 32 and a substantially flat gullet base 38, and a second gullet radius "R2" extending between the gullet base 38 and the linear projection 30.

Each linear projection 30 defines an inner end 31 substantially contiguous to the base of the rake face 24, and an outer end 33 at the entry to the gullet 28. A junction radius RP is formed between the inner end 31 of the linear projection 30 and the base of the rake face 24. In the illustrated embodiment, the junction radius RP is within the range of about 5/1000 inch to about 15/1000 inch. Because of the positive rake, as described further below, and the very small size of the radius RP, it typically should not contact the chips flowing off the rake face. Rather, the chips tangentially contact the substantially flat, linear, or non-curvilinear surface of the projection 30 as described further below. As can be seen, the linear projection 30 defines a substantially flat, linear, or non-curvilinear surface extending between its inner end 31 and outer end 33 that is inclined at an acute angle "PA" relative to a plane extending between the tips of consecutive unset teeth. In the illustrated embodiments of the present invention, the acute angle "PA" is within the range of about 64° to about 79°, and preferably is within the range of about 66° to about 70°.

Each projection 30 projects forward a distance "P1" in a direction parallel to the plane 13 between its inner end 31 and outer end 33. In the illustrated embodiments of the present invention, P1 is within the range of about 5/1000 to about 25/1000 inch, and is more preferably within the range of about 8/1000 inch to about 20/1000 inch. Accordingly, P1 is at least about 5/1000 inch, and is preferably at least about 10/1000 inch to about 15/1000 inch. As shown in FIG. 3, each tooth defines a substantially flat gullet entry surface 35 formed adjacent or preferably contiguous to the outer end 33 of the linear projection 30. As can been seen, the flat gullet entry surface 35 is oriented substantially normal (or has a steep slope relative to the plane) to the plane 13 extending between the tips of consecutive unset teeth. The second gullet radius "R2" extends between the outer end of the gullet entry surface 35 and the inner end of the flat gullet base surface 38.

As shown best in FIG. 3, each rake face 24 defines a positive rake angle "RA". A rake face defines a positive rake angle when the rake face is inclined inwardly at an angle greater than 90° relative to a plane extending between the tips of consecutive teeth. A rake face defines a "zero degree" rake angle, on the other hand, when the rake face is oriented at about 90° relative to a plane extending between the tips of teeth. A positive rake angle is determined based on the extent to which the rake face is inclined inwardly relative to the plane extending between the tips of teeth beyond 90°, e.g., 91° is equal to a 1° positive rake angle, 92° is equal to a 2° positive rake angle, and so on. In the illustrated embodiments, each positive rake angle RA is within the range of about 10° to about 17°, and is preferably within the range of about 12° to about 16°.

The substantially flat, linear, or non-curvilinear projection 30 allows for the formation of relatively tightly curled chips that are projected away from the rake face 24 of a respective tooth 18 toward the far or opposite side of the respective gullet 28. This redirecting of the chips results in more efficient use of available gullet capacity. The ranges set forth above, and particularly those for D1, PA and P1, define a geometry window that facilitates the aforementioned tightly curled chips without the adverse effects of increased cutting forces at the tooth tip. The projection 30 also allows for a reduction of the contact zone of the chips with the saw blade surface, resulting in reduction in the heat generated at the rake face surface. Because the linear projection 30 is substantially flat, linear, or non-curvilinear, and because of its inclined angle, length, and location between the base of the positive rake and the inlet to the gullet, it tangentially contacts the chips to thereby minimize the surface area of the projection in contact with the chips and the resulting cutting forces imparted on the tooth, while nevertheless forming relatively tightly curled chips and projecting or moving them toward the opposite side of the gullet 28.

Figure 2:
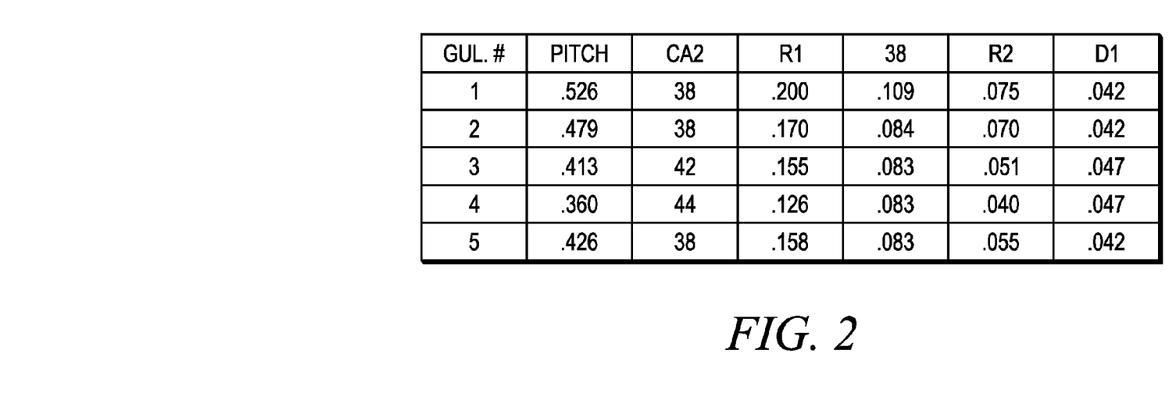
FIG. 2 is a table illustrating the dimensional features of the teeth of the band saw blade of FIG. 1.

As shown in FIGS. 1 and 2, each band saw blade 10 defines a repeating five tooth, multi-level set pattern including a first unset leading tooth (S) defining a gullet (1), a second tooth set to the right at a relatively light set magnitude (R(l)) and defining a second gullet (2), a third tooth set to the left at a relatively heavy set magnitude (L(h)) and defining a third gullet (3), a fourth tooth set to the right at a relatively heavy set magnitude (R(h)) and defining a fourth gullet (4), and a fifth tooth set to the left at a relatively light set magnitude (L(l)) and defining a fifth gullet (5) as follows:

$$S-R(l)-L(h)-R(h)-L(l),$$

where
S=Raker=Neutral Set=Nominal Tooth Tip Plane;
R(l)=Right and Light Set=Nominal Tooth Tip Plane;
L(h)=Left and Heavy Set=Maximum Tooth Tip Drop;
R(h)=Right and Heavy Set=Maximum Tooth Tip Drop; and
L(l)=Left and Light Set=Nominal Tooth Tip Plane.

The tip 20 of each unset tooth (S) is at the nominal tip tooth plane 13, the tip 20 of each light set tooth (R(l) or L(l)) is at or defines a relatively slight tooth tip drop below the nominal tooth tip plane 13, and each heavy set tooth (R(h) and L(h)) defines a maximum tooth tip drop below the nominal tooth tip plane 13. This multi-level set scheme effectively cuts difficult-to-cut materials by creating relatively deep, narrow chips which, in turn, leads to increased blade life and provides straighter cuts in comparison to prior art saw blades.

In FIG. 2, the table identifies each of the teeth of the five-tooth repeating pattern by gullet number ("Gul. #"), along with exemplary dimensions for the pitch, secondary clearance angle (CA2), the first gullet radius R1, the length of the gullet flat 38, the second gullet radius R2, and the depth D1 of the base of the rake face 24 and inner end 31 of the linear projection 30. As may be recognized by those skilled in the pertinent art based on the teachings herein, these dimensional features are only exemplary, and make take any of numerous different dimensions that are currently known, or that later become known.

It has been discovered that a primary driver for overall cutting forces is the relative cutting efficiency of the unset (e.g., S) and relatively light set teeth (e.g., R(l) and L(l)). Accordingly, as indicated in connection with the description of FIGS. 1-3 above, these teeth define relatively aggressive rake angles RA (i.e., within the range of about 10° to about 17°, and preferably within the range of about 12° to about 16°) along with the chip-controlling projection 30 described above to penetrate the sawn material with a relatively low resistance. It also has been discovered that a key to relatively long blade life with relatively straight cuts resides in the relatively heavy set teeth (L(h) and R(h)). Accordingly, in another embodiment of the present invention, with reference to FIGS. 4 and 5, the relatively heavy set teeth (L(h) and R(h)) define less aggressive rake angles RA, preferably within the range of about 60% to about 80% of the rake angles RA of the unset (S) and relatively light set teeth (R(l) and L(l)) or teeth set to a lesser magnitude than the heavy set teeth. In this alternative embodiment, the rake angles of the relatively heavy set teeth (R(h) and L(h)) are within the range of about 6° to about 14°, and more preferably, are within the range of about 7° to about 13°. The relatively less aggressive rake angles RA of the heavy set teeth R(h) and L(h) allow them to maintain substantially straight cuts due to the relatively slow or controlled wear of such teeth, while nevertheless maintaining relatively low cutting forces and tightly controlled chips due to the geometries of the unset and light set teeth S, R(l) and L(l), as described above.

Figure 4:
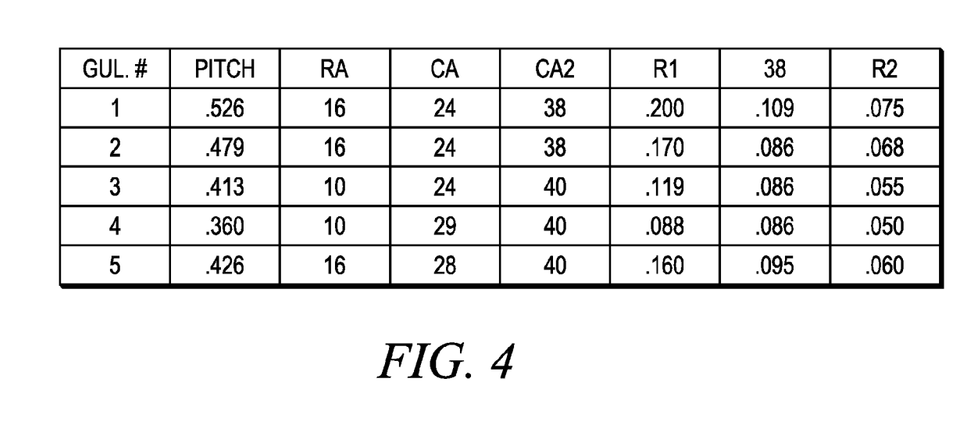
FIG. 4 is a table illustrating the dimensional features of the teeth of an alternative embodiment of a band saw blade of the present invention.
Figure 5:
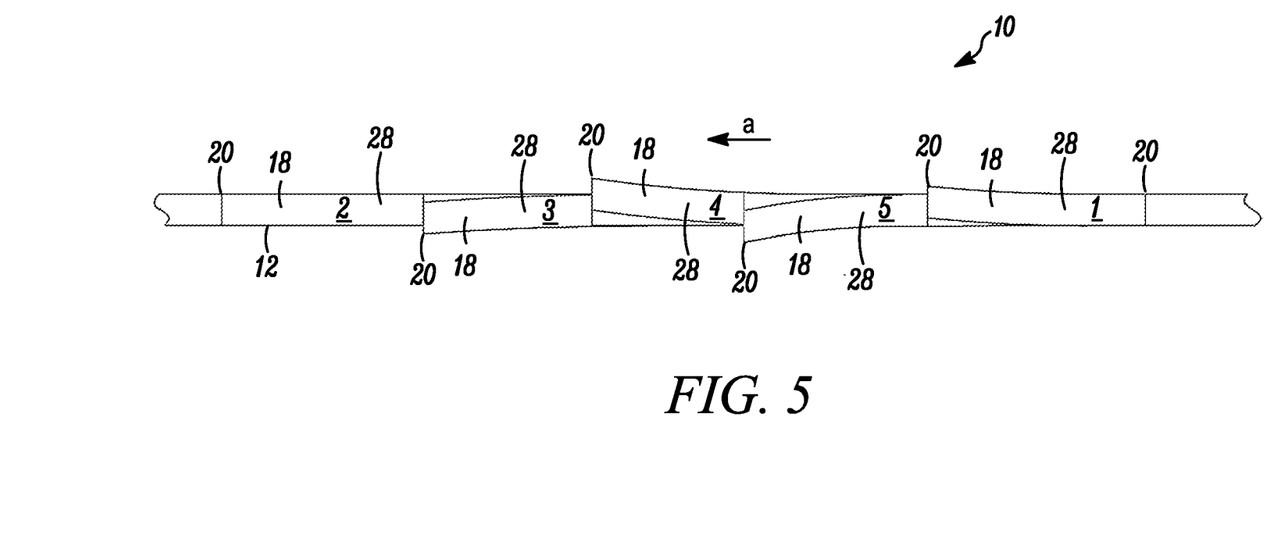
FIG. 5 is a partial, top view of the band saw blade of FIG. 4.

In FIG. 4, the table identifies each of the teeth of the five-tooth repeating pattern of this alternative embodiment by gullet number ("Gul. #"), along with exemplary dimensions for the pitch, rake angle RA, primary clearance angle CA, secondary clearance angle CA2, first gullet radius R1, the length of the gullet flat 38, and second gullet radius R2. As can be seen, gullets "3" and "4" are the left heavy (L(h)) and right heavy (R(h)) teeth, respectively, and define substantially less aggressive rake angles RA of about 10°, in contrast to the relatively aggressive rake angles RA of the unset (S) and light set teeth (R(l) and L(l)) or about 16°. As may be recognized by those skilled in the pertinent art based on the teachings herein, these dimensional features are only exemplary, and make take any of numerous different dimensions that are currently known, or that later become known.

Another exemplary band saw blade of the present invention incorporates a repeating seven tooth, two-tier set pattern as follows:

$$S-R(h)-L(h)-R(l)-L(l)-R(h)-L(h),$$

where
S=Raker=Neutral Set=Nominal Tooth Tip Plane;
R(h)=Right and Heavy Set=Maximum Tooth Tip Drop;
L(h)=Left and Heavy Set=Maximum Tooth Tip Drop;
R(l)=Right and Light Set=Nominal Tooth Tip Plane;
L(l)=Left and Light Set=Nominal Tooth Tip Plane;
R(h)=Right and Heavy Set=Maximum Tooth Tip Drop; and
L(h)=Left and Heavy Set=Maximum Tooth Tip Drop.

In the same manner as indicated above, S is the unset leading tooth, R(h) is the second tooth set to the right at a relatively heavy set magnitude, L(h) is the third tooth set to the left at a relatively heavy set magnitude, R(l) is the fourth tooth set to the right at a relatively light set magnitude, L(l) is the fifth tooth set to the left at a relatively light set magnitude, R(h) is the sixth tooth set to the right at a relatively heavy set magnitude, and L(h) is the seventh tooth set to the left at a relatively heavy set magnitude. As indicated above, the unset (S) and light set (R(l) and L(l)) teeth define relatively aggressive rake angles RA (i.e., within the range of about 10° to about 17°, and preferably within the range of about 12° to about 16°), whereas the heavy set teeth (R(h) and L(h)) define less aggressive rake angles RA, preferably within the range of about 60% to about 80% of the rake angles RA of the unset (S) and relatively light set teeth (R(l) and L(l)).

Another exemplary band saw blade of the present invention incorporates a ten tooth repeating pitch pattern with a seven/three multi-level set pattern within the pitch pattern, as follows:

$$S-R(l)-L(m)-R(m)-L(l)-R(h)-L(h)-S-R(h)-L(h)$$

S=Raker=Neutral Set=Nominal Tooth Tip Plane;
R(l)=Right and Light Set=Nominal Tooth Tip Plane;
L(m)=Left and Medium Set=Nominal Tooth Tip Plane;
R(m)=Right and Medium Set=Nominal Tooth Tip Plane;
L(l)=Left and Light Set=Nominal Tooth Tip Plane;
R(h)=Right and Heavy Set=Maximum Tooth Tip Drop;
R(h)=Right and Heavy Set=Maximum Tooth Tip Drop;
S=Raker=Neutral Set=Nominal Tooth Tip Plane;
R(h)=Right and Heavy Set=Maximum Tooth Tip Drop; and
L(h)=Left and Heavy Set=Maximum Tooth Tip Drop.

The S, R(l), L(l), R(h) and L(h) teeth are as described above. The L(m) teeth are set to the left at a medium set magnitude between the set magnitudes of the left light and left heavy set teeth, and the R(m) are set to the right at a medium set magnitude between the set magnitudes of the right light and right heavy set teeth. In the same manner as indicated above, the unset (S), light set (R(l) and L(l)), and medium set (R(m) and L(m)) teeth define relatively aggressive rake angles RA (i.e., within the range of about 10° to about 17°, and preferably within the range of about 12° to about 16°), whereas the heavy set teeth (R(h) and L(h)) define less aggressive rake angles RA, preferably within the range of about 60% to about 80% of the rake angles RA of the unset (S), relatively light set (R(l) and L(l)), and relatively medium set teeth (R(m) and L(m)). This pitch/set pattern facilitates increased chip segmentation which, in turn, leads to reduced cutting forces on the heavy set teeth (R(h) and L(h)).

In an alternative embodiment of the present invention, the relatively heavy set teeth (R(h) and L(h)) define relatively shallow primary clearance angles CA in comparison to the unset (S) and relatively light set teeth (R(l) and L(l), and if applicable, the relatively medium set teeth (R(m) and L(m)). In the currently preferred embodiments, the clearance angles CA of the relatively heavy set teeth are within the range of about 0° to about 8°. In addition, the relatively heavy set teeth (R(h) and L(h)) have primary clearance surfaces 22 that define lengths (i.e., the distance between the tip 20 and the junction between the primary clearance surface 22 and secondary clearance surface 32) within the range of about $2/1000$ inch to about $6/1000$ inch. These relatively shall clearances on the heavy set teeth impart a stable, "pre-worn" tooth geometry to these teeth. The unset teeth and relatively light set teeth, on the other hand, define geometries as described above in connection with the embodiment of FIGS. 1-3. As a result, the heavy set teeth wear in a relatively even or consistent manner by avoiding the chaotic tooth wear that can be inherent in saw teeth with sharper tips (e.g., with more aggressive primary clearance angles), while nevertheless maintaining relatively low cutting forces and tightly controlled chips due to the geometries of the unset and light set teeth, as described above in connection with FIGS. 1-3.

As may be recognized by those of ordinary skill in the pertinent art based on the teachings herein, numerous changes and modification may be made to the above-described and other embodiments of the present invention without departing from its scope as defined in the appended claims. For example, the geometry of the teeth may take any of numerous different shapes and/or dimensions other than those disclosed herein. Similarly, the teeth may take any of numerous different sets, pitches, set patterns, and/or pitch patterns other than as disclosed herein. In addition, the present invention is not limited to band saw blades, but may be incorporated in, for example, hole saws or hole cutters. Still further, the saw blades of the present invention may be made of any of numerous different materials or combinations of materials, such as bi-metal or carbide tipped, or other saw blade saw materials that are currently known, or that later become known. Accordingly, this detailed description of embodiments is to be taken in an illustrative as opposed to a limiting sense.

What is claimed is:

1. A metal-cutting saw blade, comprising:
a cutting edge including a plurality of teeth thereon,
wherein the teeth each include a tip, a clearance surface located on one side of the tip, a rake face located on an opposite side of the tip relative to the clearance surface, a gullet, a flat or linear projection formed between the rake face and the gullet and projecting outwardly relative to the rake face and adapted to create curled metal chips and move the chips away from the rake face toward an opposite side of the gullet relative to the rake face, a junction radius formed between the projection and the rake face, and a flat gullet entry surface formed between the projection and the gullet,
wherein the projection is inclined at an acute angle within a range of 64° to 79° relative to a plane extending between the tips of at least two of the teeth, wherein the projection extends from the junction radius to the gullet entry surface, wherein the projection defines an inner end adjacent to the junction radius and an outer end adjacent to the gullet entry surface, wherein the inner end is located at a depth below the tip of at least $25/1000$ inch, and wherein a distance between the inner end and the outer end of the projection in a direction parallel to the plane is less than $65/1000$ inch.

2. A saw blade as defined in claim 1, wherein the acute angle is within a range of 66° to 70°.

3. A saw blade as defined in claim 1, wherein the depth is within a range of $25/1000$ inch to $65/1000$ inch.

4. A saw blade as defined in claim 1, wherein the depth is within a range of $30/1000$ inch to $55/1000$ inch.

5. A saw blade as defined in claim 1, wherein the rake face defines a positive rake angle.

6. A saw blade as defined in claim 5, wherein the positive rake angle is within a range of 10° to 17°.

7. A saw blade as defined in claim 6, wherein the positive rake angle is within a range of 12° to 16°.

8. A saw blade as defined in claim 1, wherein the distance is at least $5/1000$ inch.

9. A saw blade as defined in claim 8, wherein the distance is at least $15/1000$ inch.

10. A saw blade as defined in claim 8, wherein the distance is within a range of $5/1000$ inch to $25/1000$ inch.

11. A saw blade as defined in claim 10, wherein the distance is within a range of $8/1000$ inch to $20/1000$ inch.

12. A saw blade as defined in claim 1, wherein the plurality of teeth define a repeating set pattern including an unset leading tooth, at least one relatively light set tooth trailing the unset leading tooth and defining a relatively light set magnitude, and at least one relatively heavy set tooth trailing the unset leading tooth and defining a relatively heavy set magnitude in comparison to the set magnitude of the at least one relatively light set tooth, and wherein the at least one relatively heavy set tooth defines a rake angle that is less than a rake angle of one or more of the unset leading tooth and the at least one relatively light set tooth.

13. A saw blade as defined in claim 12, wherein the rake angle of the at least one relatively heavy set tooth is less than each of the rake angle of the unset leading tooth and the rake angle of the at least one relatively light set trailing tooth.

14. A saw blade as defined in claim 13, wherein the rake angle of the at least one relatively heavy set tooth is at least 60% less than each of the rake angle of the unset leading tooth and the rake angle of the at least one relatively light set trailing tooth.

15. A saw blade as defined in claim 14, wherein the rake angle of the at least one relatively heavy set tooth is within a range of 60% to 80% less than each of the rake angle of the unset leading tooth and the rake angle of the at least one relatively light set trailing tooth.

16. A saw blade as defined in claim 14, wherein the at least one relatively light set tooth includes a relatively light right set trailing tooth and a relatively light left set trailing tooth, and wherein the at least one relatively heavy set tooth includes a relatively heavy left set trailing tooth and a relatively heavy right set trailing tooth.

17. A saw blade as defined in claim 16, wherein the unset leading tooth is followed by the relatively light right set trailing tooth, which is followed by the relatively heavy left set trailing tooth, which is followed by the relatively heavy right set trailing tooth, which is followed by the relatively light left set trailing tooth.

18. A saw blade as defined in claim 1, wherein the plurality of teeth define a repeating set pattern including an unset leading tooth, at least one relatively light set tooth trailing the unset leading tooth and defining a relatively light set magnitude, and at least one relatively heavy set tooth trailing the unset leading tooth and defining a relatively heavy set magnitude in comparison to the set magnitude of the at least one relatively light set tooth, and wherein the at least one relatively heavy set tooth defines a primary clearance angle that is less than each of a primary clearance angle of the unset leading tooth and a primary clearance angle of the at least one relatively light set trailing tooth.

19. A saw blade as defined in claim 18, wherein the primary clearance angle of the at least one relatively heavy set tooth is within a range of 0° to 8°.

20. A saw blade as defined in claim 18, wherein the primary clearance surface of the at least one relatively heavy set tooth is shorter than each of the primary clearance surface of the unset leading tooth and the primary clearance surface of the at least one relatively light set tooth.

21. A saw blade as defined in claim 20, wherein the primary clearance surface of the at least one relatively heavy set tooth defines a length within a range of $2/1000$ inch to $6/1000$ inch.

22. A saw blade as defined in claim 1, wherein the saw blade is a band saw blade or a hole cutter.

23. A saw blade as defined in claim 1, wherein the gullet entry surface is oriented normal to the plane, and wherein the gullet entry surface is contiguous to the outer end of the projection.

24. A saw blade as defined in claim 1, wherein the junction radius is within a range of $5/1000$ inch to $15/1000$ inch.

25. A saw blade as defined in claim 1, wherein the plurality of the teeth define a pitch of at least 360/1000 inch.

26. A metal-cutting saw blade, comprising:
a cutting edge including a plurality of teeth thereon,
wherein the teeth each include a tip, a clearance surface located on one side of the tip, a rake face located on an opposite side of the tip relative to the clearance surface, a gullet, means for projecting outwardly from the rake face between the rake face and the gullet, for tangentially contacting and creating curled metal chips, and for moving the chips away from the rake face toward an opposite side of the gullet relative to the rake face, a junction radius formed between the means and the rack face, and a flat gullet entry surface formed between the means and the gullet, wherein the means includes a flat or linear surface inclined at an acute angle within a range of 64° to 79° relative to a plane extending between the tips of at least two of the teeth, wherein the flat or linear surface extends from the junction radius to the gullet entry surface, and wherein the flat or linear surface defines an inner end adjacent to the junction radius and an outer end adjacent to the gullet entry surface.

27. A saw blade as defined in claim 26, wherein the inner end is located at a depth below the tip of at least $25/1000$ inch, and wherein the distance between the inner end and the outer end in a direction parallel to the plane is less than $65/1000$ inch.

28. A saw blade as defined in claim 26, wherein the rake face defines a positive rake angle within a range of 10° to 17°.

29. A saw blade as defined in claim 26, wherein the plurality of teeth define a repeating set pattern including an unset leading tooth, a relatively light set tooth trailing the unset leading tooth and defining a relatively light set magnitude, and a relatively heavy set tooth trailing the unset leading tooth and defining a relatively heavy set magnitude in comparison to the set magnitude of the relatively light set tooth, and wherein the relatively heavy set tooth defines a rake angle that is less than a rake angle of at least one of the unset leading tooth and the relatively light set tooth.

30. A metal-cutting saw blade, comprising a cutting edge including a plurality of teeth thereon, each of the teeth including a tip; a clearance surface located on one side of the tip; a rake face located on an opposite side of the tip relative to the clearance surface; a gullet; a flat or linear projection formed between the rake face and the gullet and adapted to create curled metal chips and move the chips away from the rake face toward an opposite side of the gullet relative to the rake face, a junction radius formed between the projection and the rake face, and a flat gullet entry surface formed between the projection and the gullet, wherein the projection projects outwardly relative to the rake face and is inclined at an acute angle within a range of 64° to 79° relative to a plane extending between the tips of at least two of the teeth, wherein the projection extends from the junction radius to the gullet entry surface, wherein the projection defines an inner end adjacent to the rake face and an outer end adjacent to the gullet entry surface, and wherein the gullet entry surface is oriented and has a steep slope relative to the plane.

31. A saw blade as defined in claim 30, wherein the gullet entry surface is contiguous to the outer end of the projection.

32. A saw blade as defined in claim 30, wherein the junction radius is within a range of $5/1000$ inch to $15/1000$ inch.

33. A saw blade as defined in claim 30, wherein the rake face defines a positive rake angle within a range of 10° to 17°.

34. A saw blade as defined in claim 30, wherein the plurality of teeth define a repeating set pattern including an unset leading tooth, a relatively light set tooth trailing the unset leading tooth and defining a relatively light set magnitude, and a relatively heavy set tooth trailing the unset leading tooth and defining a relatively heavy set magnitude in comparison to the set magnitude of the relatively light set tooth, and wherein the relatively heavy set tooth defines a rake angle that is less than a rake angle of at least one of the unset leading tooth and the relatively light set tooth.

* * * * *